US005938879A

United States Patent [19]

Brown

[11] Patent Number: 5,938,879

[45] Date of Patent: Aug. 17, 1999

[54] METHOD FOR EMPLOYING GRAPHICS ON A SUPPORT MEMBER

[76] Inventor: Russell S. Brown, 1673 Kaiakaua Ave., Honolulu, Hi. 98826

[21] Appl. No.: 08/797,871

[22] Filed: Feb. 10, 1997

[51] Int. Cl.[6] .............................. B32B 31/20; B32B 31/18

[52] U.S. Cl. .......................... 156/256; 156/250; 156/267; 156/289; 156/308.2

[58] Field of Search ..................................... 156/250, 256, 156/267, 289, 308.2, 306.6

[56] References Cited

U.S. PATENT DOCUMENTS

| | | |
|---|---|---|
| 5,032,449 | 7/1991 | af Strom . |
| 5,047,110 | 9/1991 | Bryant et al. . |
| 5,098,772 | 3/1992 | af Strom . |
| 5,364,688 | 11/1994 | Mahn, Jr. . |
| 5,380,391 | 1/1995 | Mahn, Jr. . |
| 5,437,755 | 8/1995 | Lavorel et al. . |
| 5,508,248 | 4/1996 | Nagashima . |

*Primary Examiner*—Curtis Mayes
*Attorney, Agent, or Firm*—Michael I. Kroll

[57] ABSTRACT

A method for employing graphics on a support member that can transfer by heat a design of colored metallic foil onto a flat or curved surface of the support member. The method can also transfer by heat a decal onto the flat or curved surface of the support member.

3 Claims, 16 Drawing Sheets

METHOD FOR EMPLOYING GRAPHICS ON A SUPPORT MEMBER

BACKGROUND OF THE INVENTION

1. Field of the Invention

The instant invention relates generally to heat transfer systems and more specifically it relates to a method for employing graphics on a support member. The method for employing graphics on a support member, will transfer by heat a design of colored hot stamping foil onto the support member, as well as a decal onto the support member.

2. Description of the Prior Art

Numerous heat transfer systems have been provided in prior art. For example, U.S. Pat. Nos. 5,364,688 to Mahn, Jr., 5,380,391 to Mahn, Jr.; 5,437,755 to Lavorel et al. and 5,508,248 to Nagashima all are illustrative of such prior art. While these units may be suitable for the particular purpose to which they address, they would not be as suitable for the purposes of the present invention as heretofore described.

A heat activated transfer which is particularly suitable for marking elastomeric articles comprises a lower elastomeric layer bonded to an upper polyester layer. The upper polyester layer in turn carries indicia which is a sublimation dye heat transferred into the polyester layer. The polyester is preferably a high temperature saturated polyester resin, preferably polyethylene terephthalate. The lower layer is preferably a thermoplastic elastomeric layer. The two layers are bonded together by a thermoplastic adhesive, preferably a polyester.

An article and method for marking elastomeric articles, such as tires, floor mats, and the like, includes an elastomeric sheet which is marked with indicia using a solvent based ink which contrasts with the elastomeric sheet. The indicia is cured with a clear thermoset layer such as a polyurethane. This is then applied to an uncured elastomeric article and the elastomeric article is cured. The heat and the pressure of curing causes the elastomeric sheet to bond to the elastomeric article. The indicia remains discernible and is not easily marred or dulled. After curing, the transfer can be further marked by heat transferring indicia in the form of a sublimation dye through the clear polyurethane layer.

A process for decorating the top portion of the ski including a step of assembling and affixing an external, thick layer of transparent plastic material onto an opaque internal layer. Prior to the assembly step, the first decoration is transferred onto the external surface of the external layer and a second internal decoration, different from the first, is transferred onto one of the surfaces connecting the internal layer with the external layer. The invention enables an economical production of varied and easily interchangeable decorations.

A base sheet and a heat transfer sheet are herein provided and make it possible to cut out any arbitrary figure or design from the heat transfer sheet having a thin heat transferable layer with an automatic cutting machine. The base sheet has a first support member and a second support member peelably integrated with the first support member, while the heat transfer sheet has the foregoing base sheet and the transferable layer formed on the second support member of the base sheet optionally through a releasing layer.

SUMMARY OF THE INVENTION

A primary object of the present invention is to provide a method for employing graphics on a support member that will overcome the shortcomings of the prior art devices.

Another object is to provide a method for employing graphics on a support member that will transfer by heat a design of colored hot stamping foil onto a flat or curved surface of the support member, which can be a snowboard or a bodyboard, as used in surfing.

An additional object is to provide a method for employing graphics on a support member that will transfer by heat a decal onto the flat or curved surface of the support member.

A further object is to provide a method for employing graphics on a support member that is simple and easy to use.

A still further object is to provide a method for employing graphics on a support member that is economical in cost to manufacture.

Further objects of the invention will appear as the description proceeds.

To the accomplishment of the above and related objects, this invention may be embodied in the form illustrated in the accompanying figures, attention being called to the fact, however, that the figures are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying figures, in which like reference characters designate the same or similar parts throughout the several views, and wherein.

Similar reference characters denote corresponding features consistently throughout the attached figures.

DETAILED DESCRIPTION OF THE PREFERRED EMBODIMENTS

Figure 1:
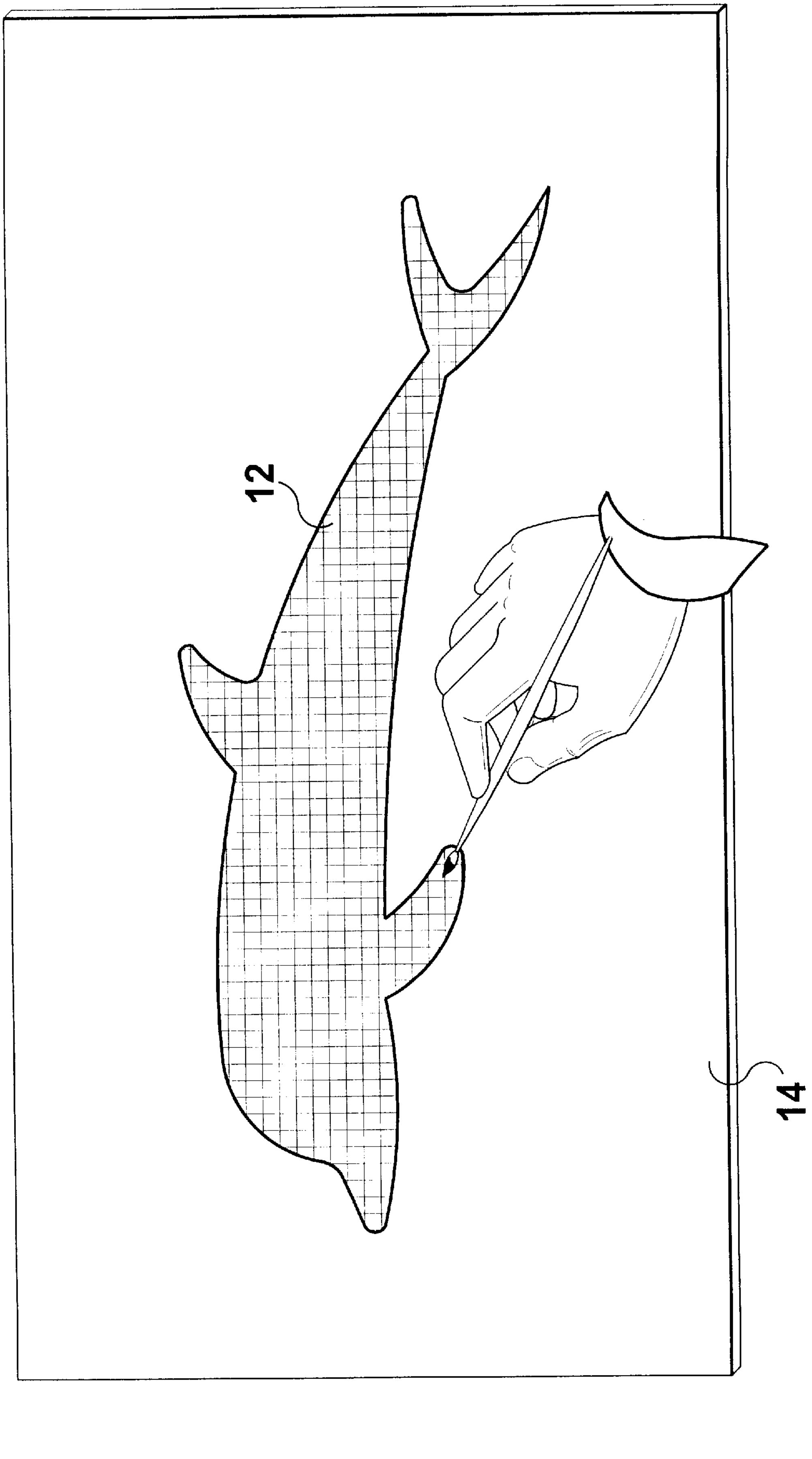
FIG. 1 is a perspective view, showing a design being applied onto a piece of white paper that is used by step one of a first embodiment of the invention.
Figure 2:
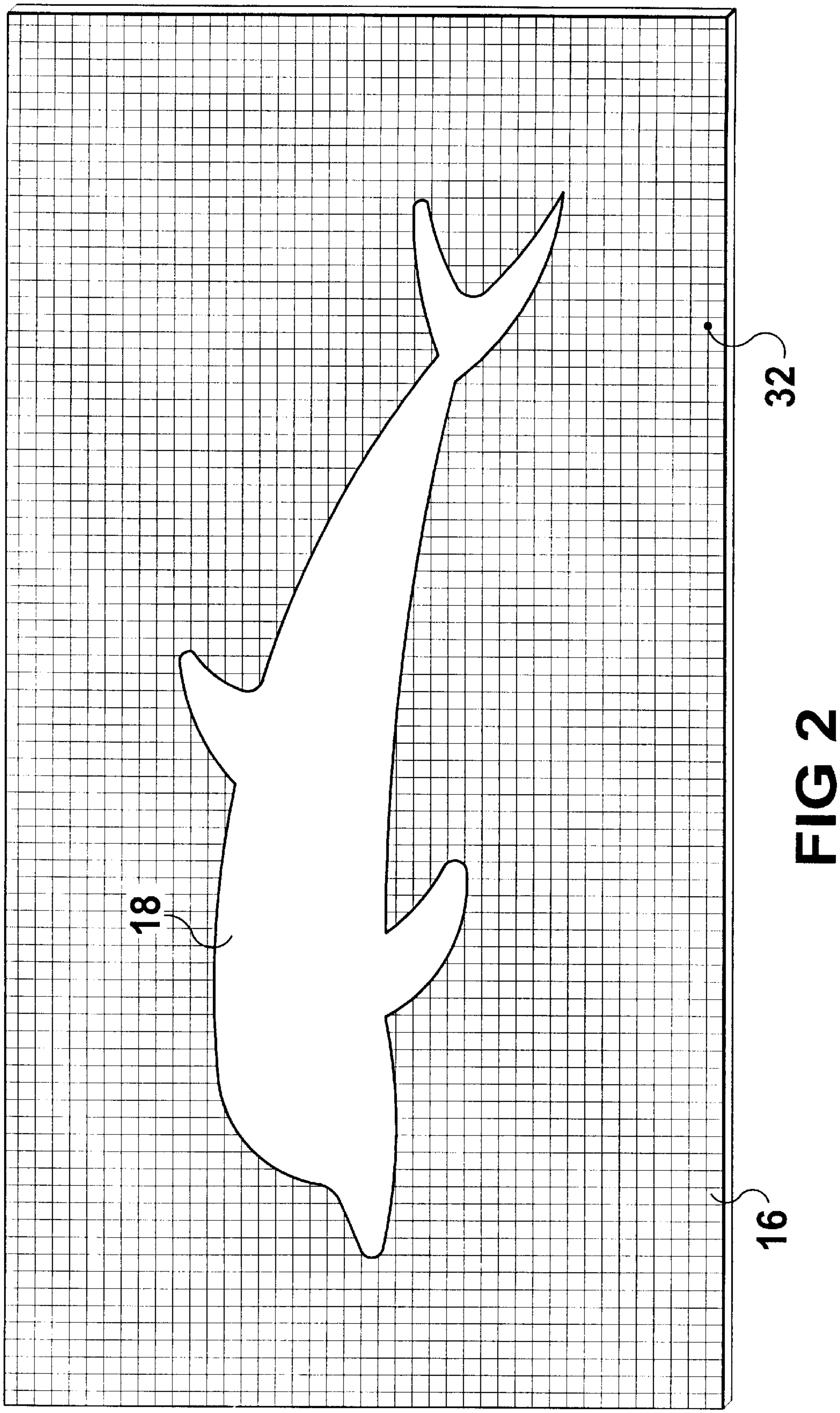
FIG. 2 is a perspective view, showing an inverse design on a black and white xerographic copy used in step two of the first embodiment.
Figure 3:
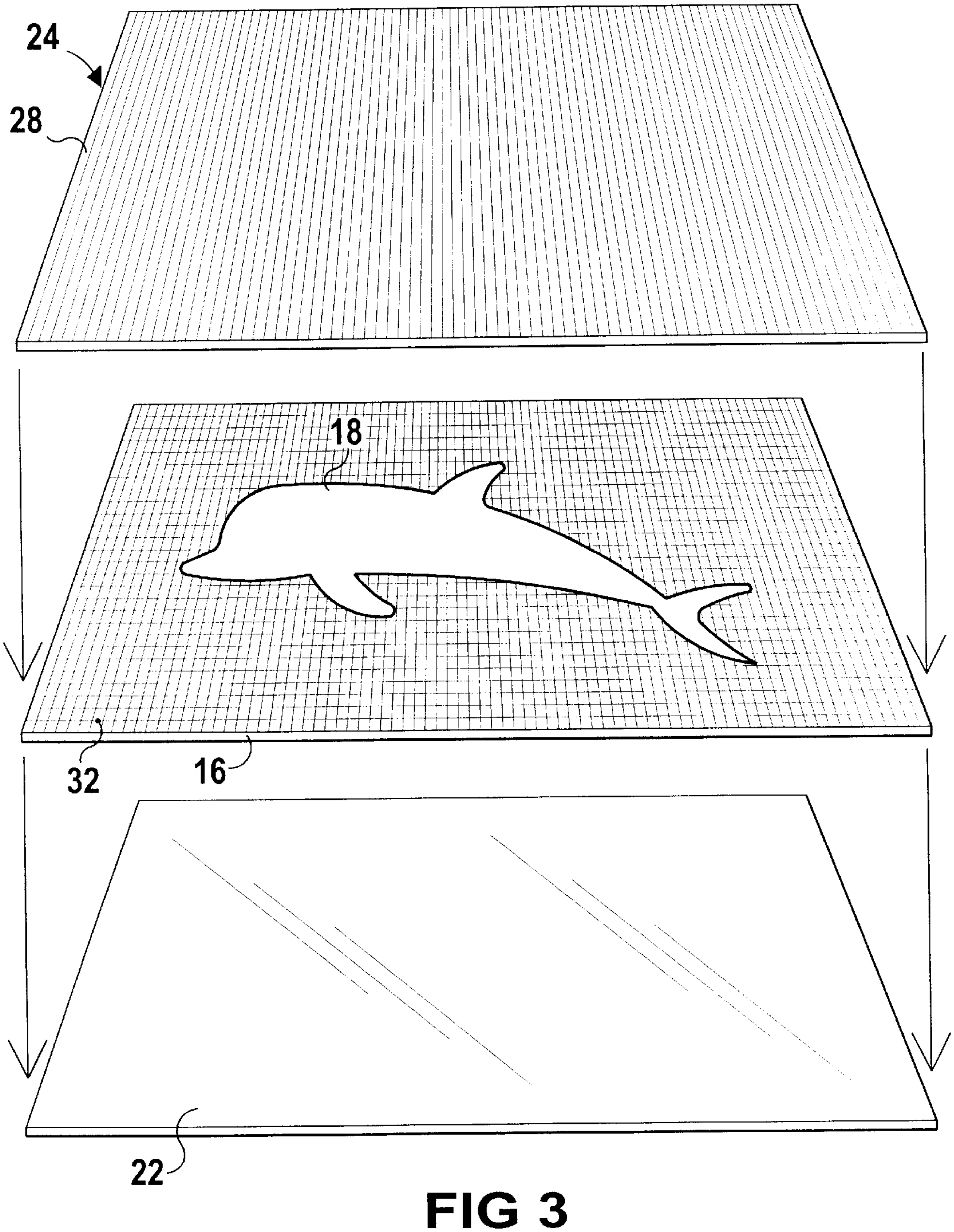
FIG. 3 is an exploded perspective view, showing the three components used in steps four, five and six of the first embodiment.
Figure 5:
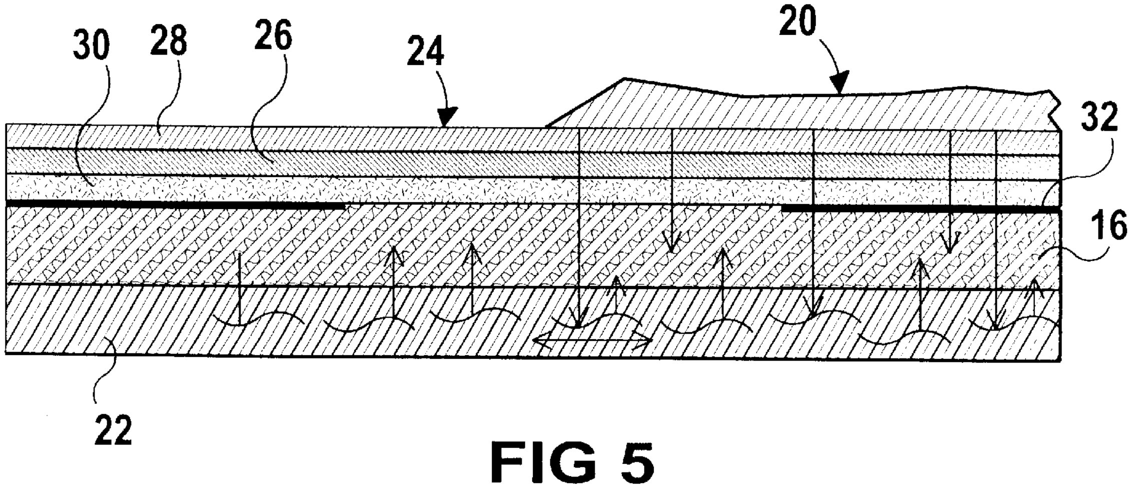
FIG. 5 is an enlarged cross sectional view taken along line 5—5 in FIG. 4.
Figure 6:
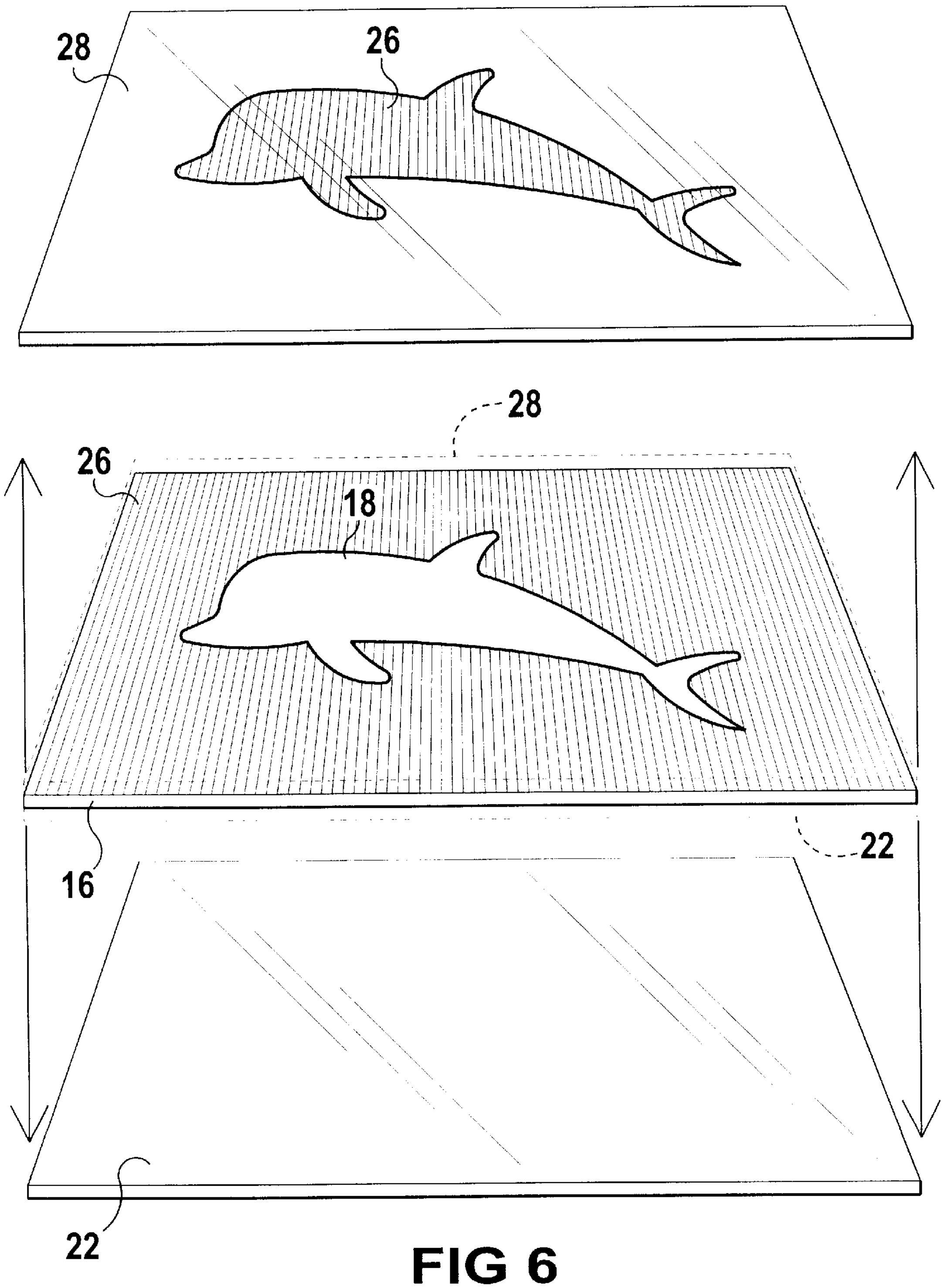
FIG. 6 is an exploded perspective view, showing the three components separated to form the final results in step ten of the first embodiment.
Figure 7:
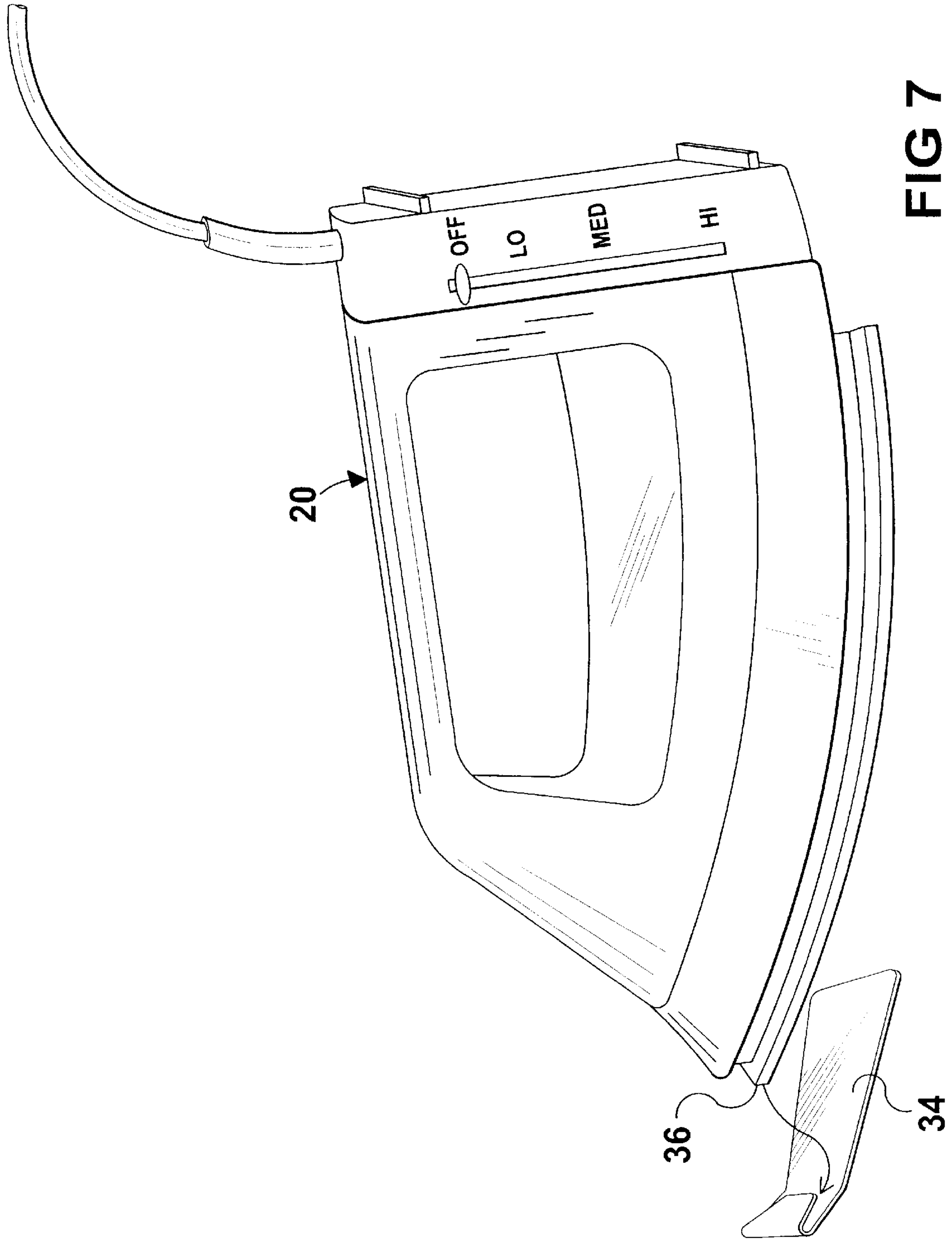
FIG. 7 is a perspective view of the iron, showing the heat tip ready to be attached thereto in step eleven of the first embodiment and in step four in the second embodiment.
Figure 8:
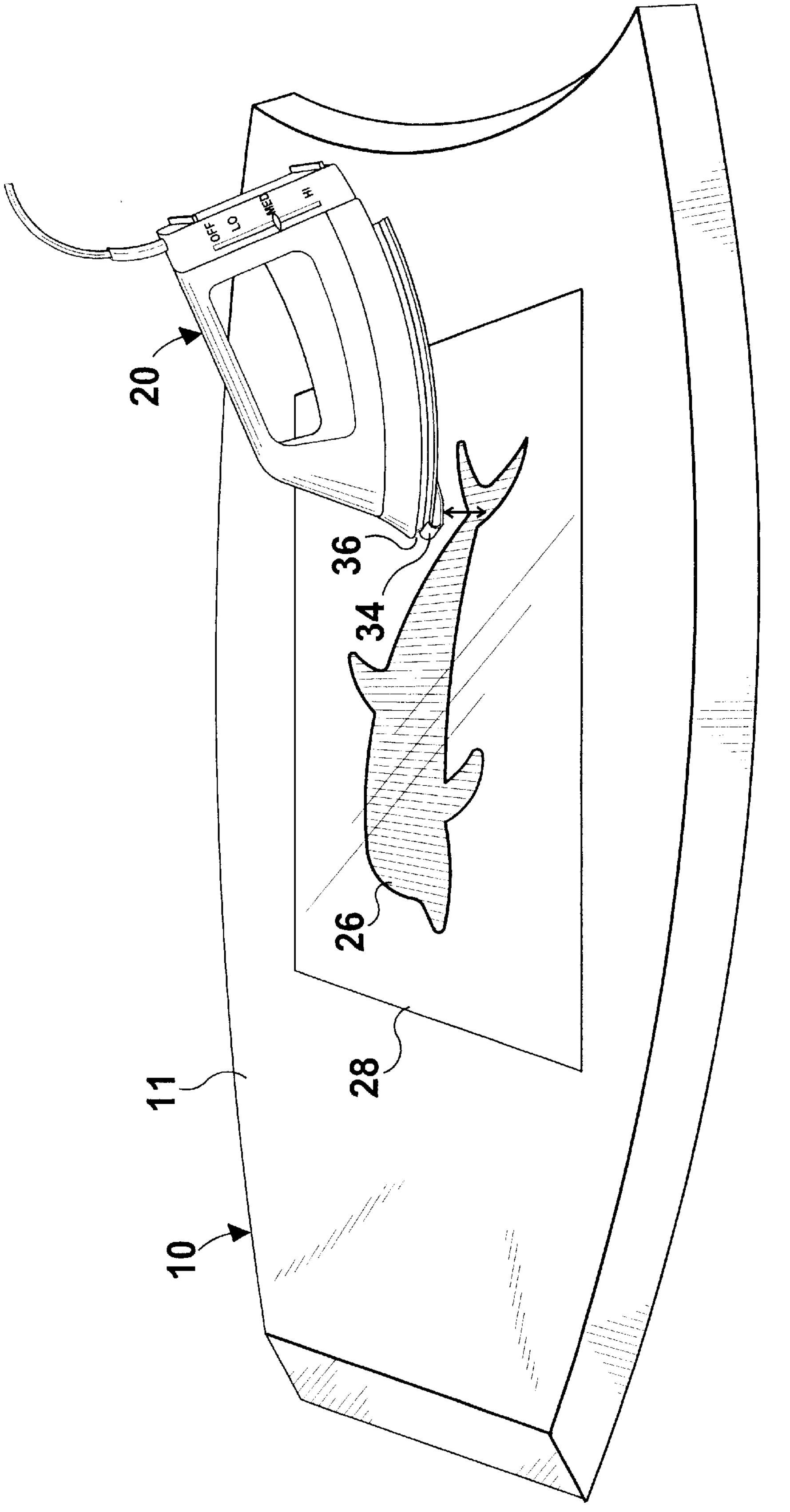
FIG. 8 is a perspective view, showing the mylar sheet with foil design on the support member and the iron ready to be placed thereon in steps eleven, twelve and thirteen.
Figure 9:
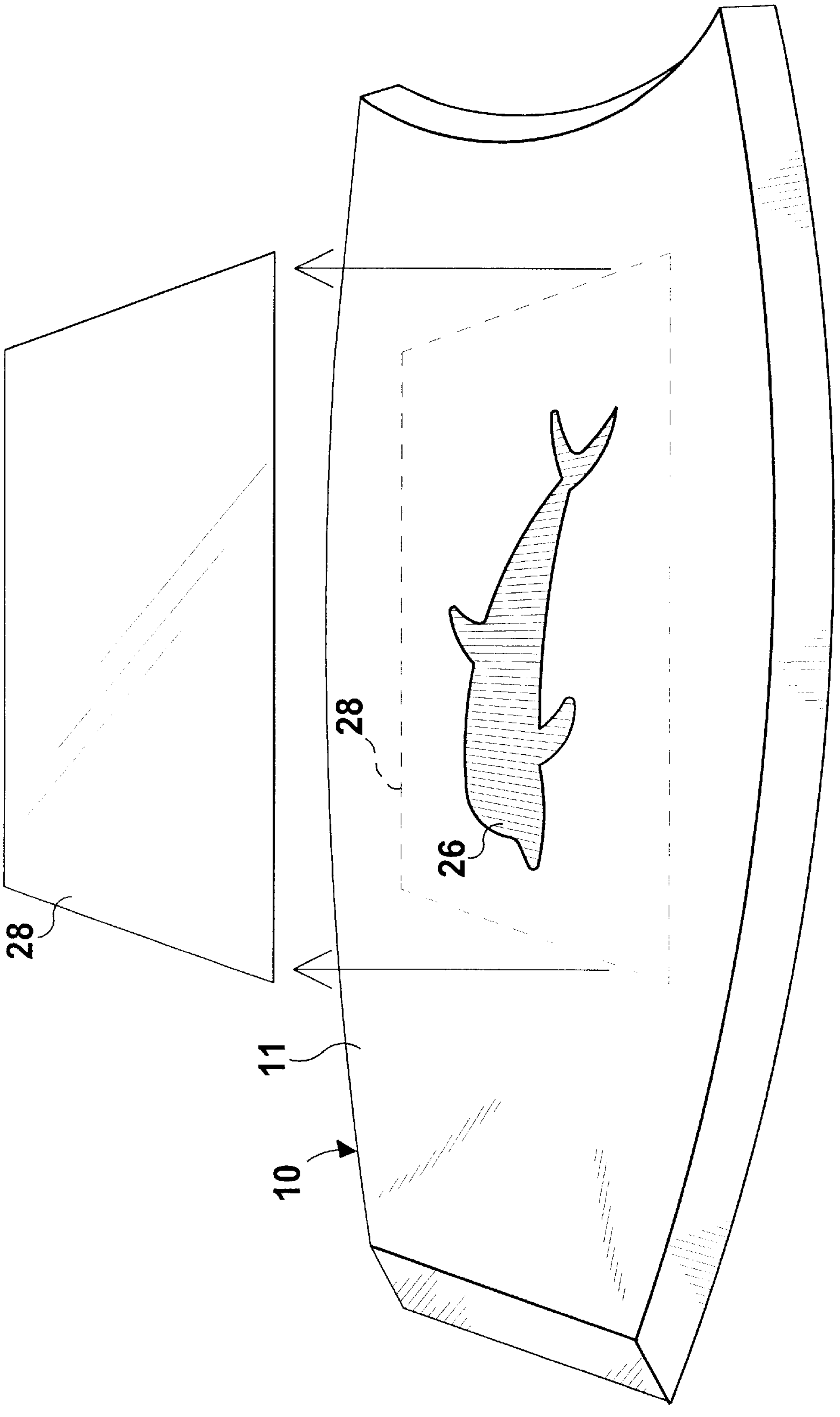
FIG. 9 is a perspective view, showing the mylar sheet peeled off from the foil design in step sixteen.

Turning now descriptively to the figures, in which similar reference characters denote similar elements throughout the several views. A first embodiment of the invention consists of a method for employing graphics on a support member 10, such as a flat bodyboard 11 or a tire (not shown), which comprises:

1. Producing a design 12 which can be any name, photograph, picture and drawing that can be reproduced onto a piece of plain white paper 14, as in FIG. 1.
2. Making a black and white xerographic copy 16 of the design in a inverse design 18, as in FIG. 2.
3. Placing on a suitable work space, some old newspapers or any materials, which will provide a flat stable surface and be unaffected by a low temperature iron 20.
4. Placing a supplied acetate sheet 22 on the work space, as in FIG. 3.
5. Placing the black and white xerographic copy 16 with the inverse design 18 on top of the acetate sheet 22, as in FIG. 3.
6. Placing a selected color foil sheet 24 with its shiny side up on top of the black and white xerographic copy 16 with the inverse design 18, as in FIG. 3. The selected color foil sheet 24 is composed of a thin metallic foil layer 26 contained between a Mylar layer 28 and an adhesive layer 30, as in FIG. 5.
7. Putting the iron 20 set on low heat (one hundred fifty degrees to two hundred degrees Fahrenheit) on top of the Mylar layer 28 and pass over the entire design in a smooth and consistent manner for approximately fifteen to thirty seconds depending on the complexity and amount of detail contained on the inverse design 18. A fine detail design would require the longer time period to ensure proper bonding between the xerographic toner ink 32 of the design and the adhesive layer 30 of the foil sheet 24, as in FIG. 4.
8. Using the acetate sheet 22 as an underlayment to allow an easier, better bonding of the foil layer 26 to the xerographic toner ink 32. The acetate sheet 22 acts as a heat reflector for consistent even heat on the design, so that with the application of heat, the adhesive layer 30 of the foil sheet 24 will bond to the xerographic toner ink 32 of the design, while the foil 24 will not bond to the paper 16, but only to the xerographic toner ink 32 on the paper, as in FIG. 5.
9. Letting the foil 26 cool for five to ten seconds.
10. Grasping the foil sheet 24 and peel off from the paper 16 containing the inverse design 18. The results are that the adhesive 30 and foil 26, still attached to the Mylar layer 28, is an exact copy of the design 12 which was used to make the inverse design 18 on the black and white xerographic copy 16, as in FIG. 6.
11. Attaching a supplied heat tip 34 to a front tip 36 of the iron 20 set at the temperature of medium heat (two hundred fifty degrees to three hundred degrees Fahrenheit), as in FIG. 7.
12. Placing the Mylar layer 28 with the foil design 26 over an area on the support member 10 where the design will be located, as in FIG. 8.
13. Placing the iron 20 at a fifteen to twenty degree angle to the support member 10, so as to position the heat tip 34 parallel to the support member 10, as in FIG. 8.
14. Pressing the heat tip 34 on the iron 20 on the Mylar layer 28 directly over the remaining foil layer 26 for two to four seconds, then raise the iron 20 and continue until the entire design has been covered, as in FIG. 8.
15. Letting the foil 26 cool for five to ten seconds.
16. Grasping the Mylar layer 28 and peel off from the foil design 26, as shown in FIG. 9.

Figure 10:
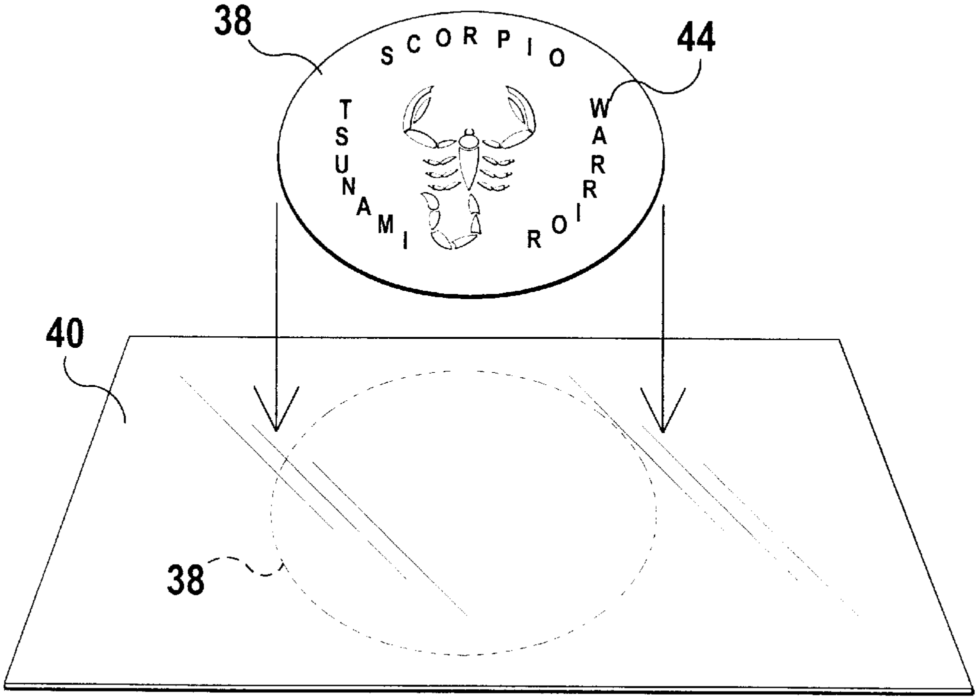
FIG. 10 is an exploded perspective view, showing a decal ready to be adhered to a polyester sheet in steps one and two of the second embodiment.
Figure 11:
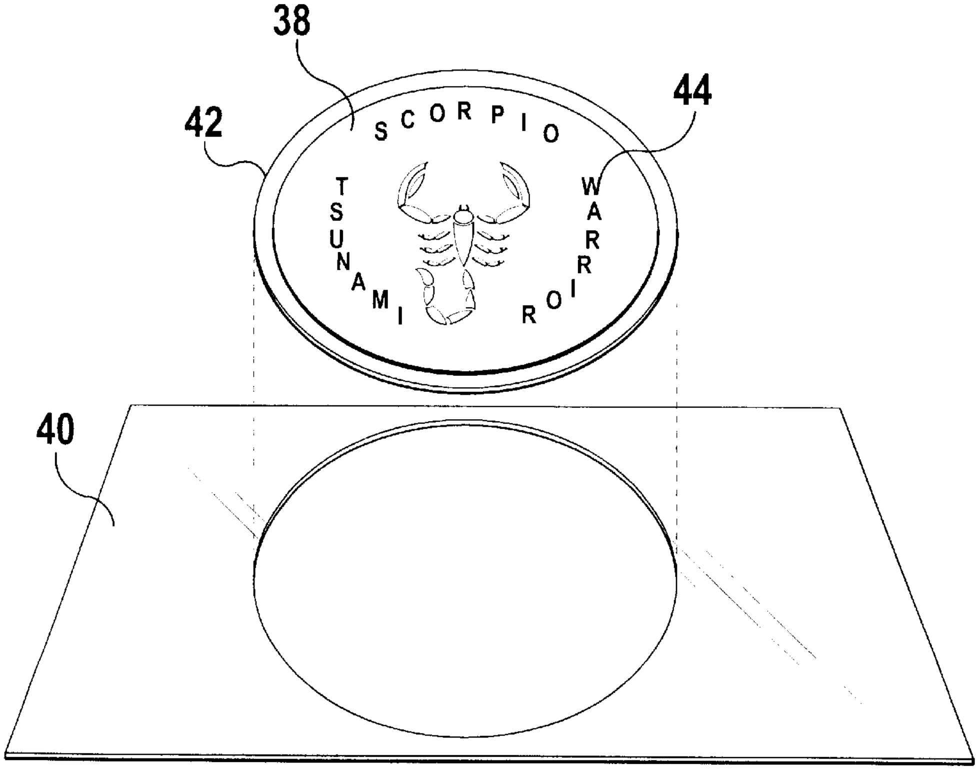
FIG. 11 is an exploded perspective view, showing the decal cut out from the polyester sheet in step three of the second embodiment.
Figure 12:
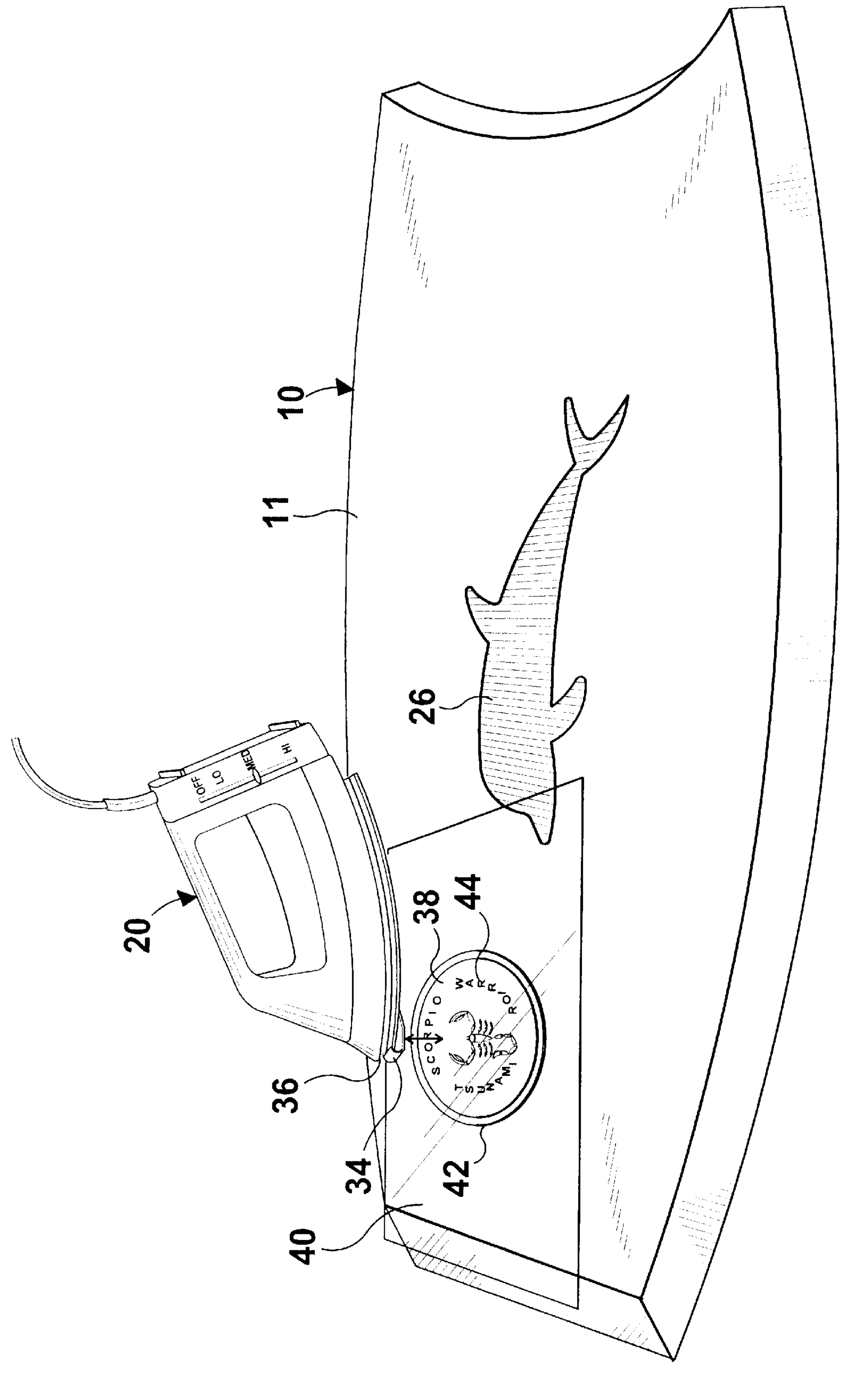
FIG. 12 is a perspective view, showing the decal placed on an area of the support member, with an acetate sheet on top of the decal and the iron ready to be pressed on the acetate sheet in steps five, six, seven and eight of the second embodiment.
Figure 13:
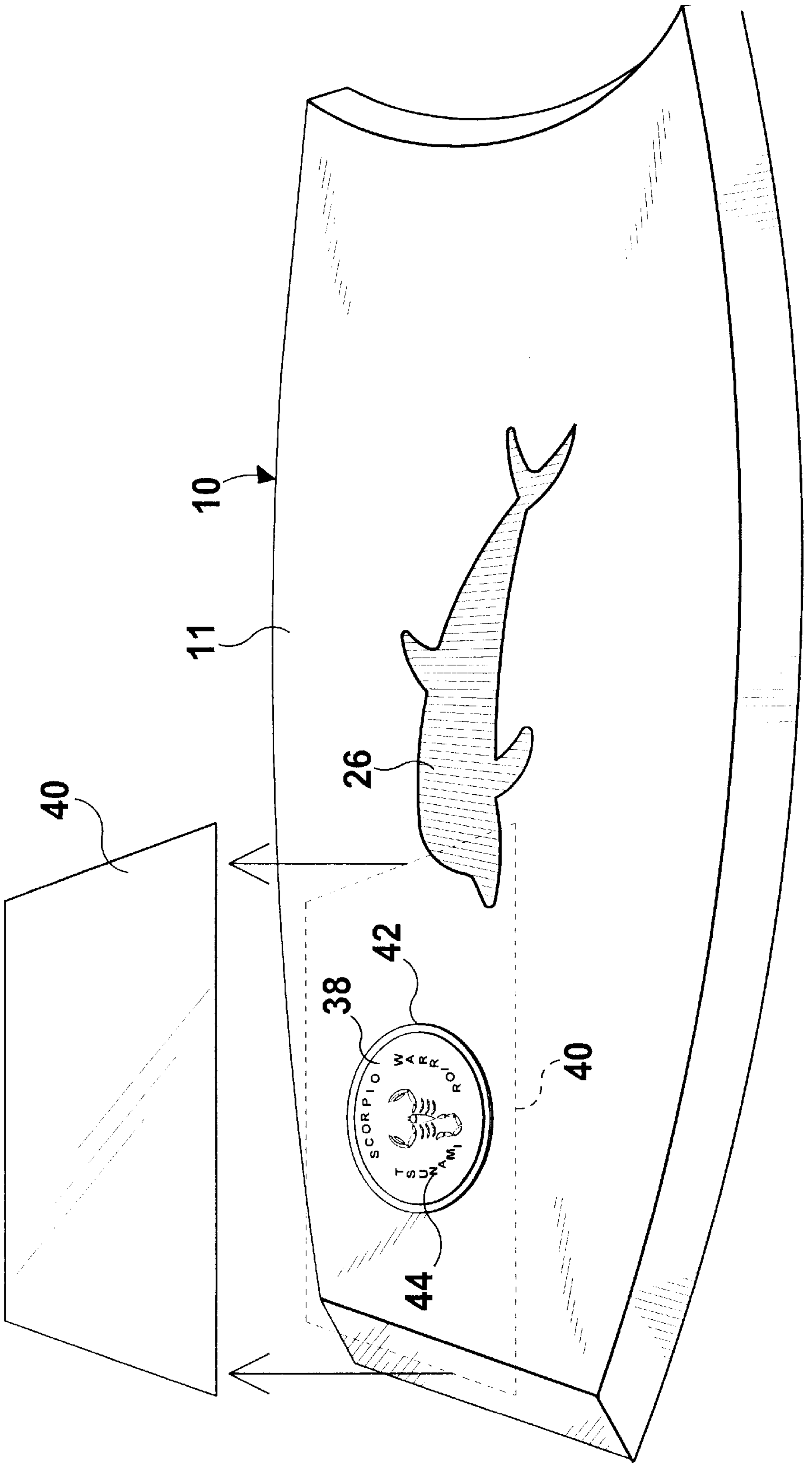
FIG. 13 is a perspective view similar to FIG. 12, showing the acetate sheet removed therefrom in step nine.

A second embodiment of the invention also consists of a method for employing graphics on the support member 10, which comprises:

1. Supplying a decal 38 by a user, as in FIG. 10.
2. Adhering the decal 38 to the shiny side of a supplied polyester sheet 40, marked "D", with a polyethylene coating on one surface, as in FIG. 10.
3. Cutting around the decal 38 leaving at least an eighth of an inch border 42, as in FIG. 11.
4. Attaching the supplied heat tip 34 to the front tip 36 of the iron 20 set at the temperature of medium heat (two hundred and fifty degrees to three hundred degrees Fahrenheit), as in FIG. 7.
5. Placing the decal 38 on an area of the support member 10 where it will be located, as in FIG. 12.
6. Placing a supplied acetate sheet 40 on top of the decal 38, so that the acetate sheet 40 will prevent the heat tip from burning the ink 44 off the decal 38, as in FIG. 12.
7. Placing the iron 20 at a fifteen to twenty degree angle to the support member 10, so as to position the heat tip 34 parallel to the support member 10, as in FIG. 12.
8. Pressing the heat tip 34 on the iron 20 on the acetate sheet 40 directly over the decal 38 for four to six seconds, then raise the iron 20 and continue until the entire decal 38 has been covered, as in FIG. 12.
9. Removing the acetate sheet 40, as in FIG. 13.

Figure 14:
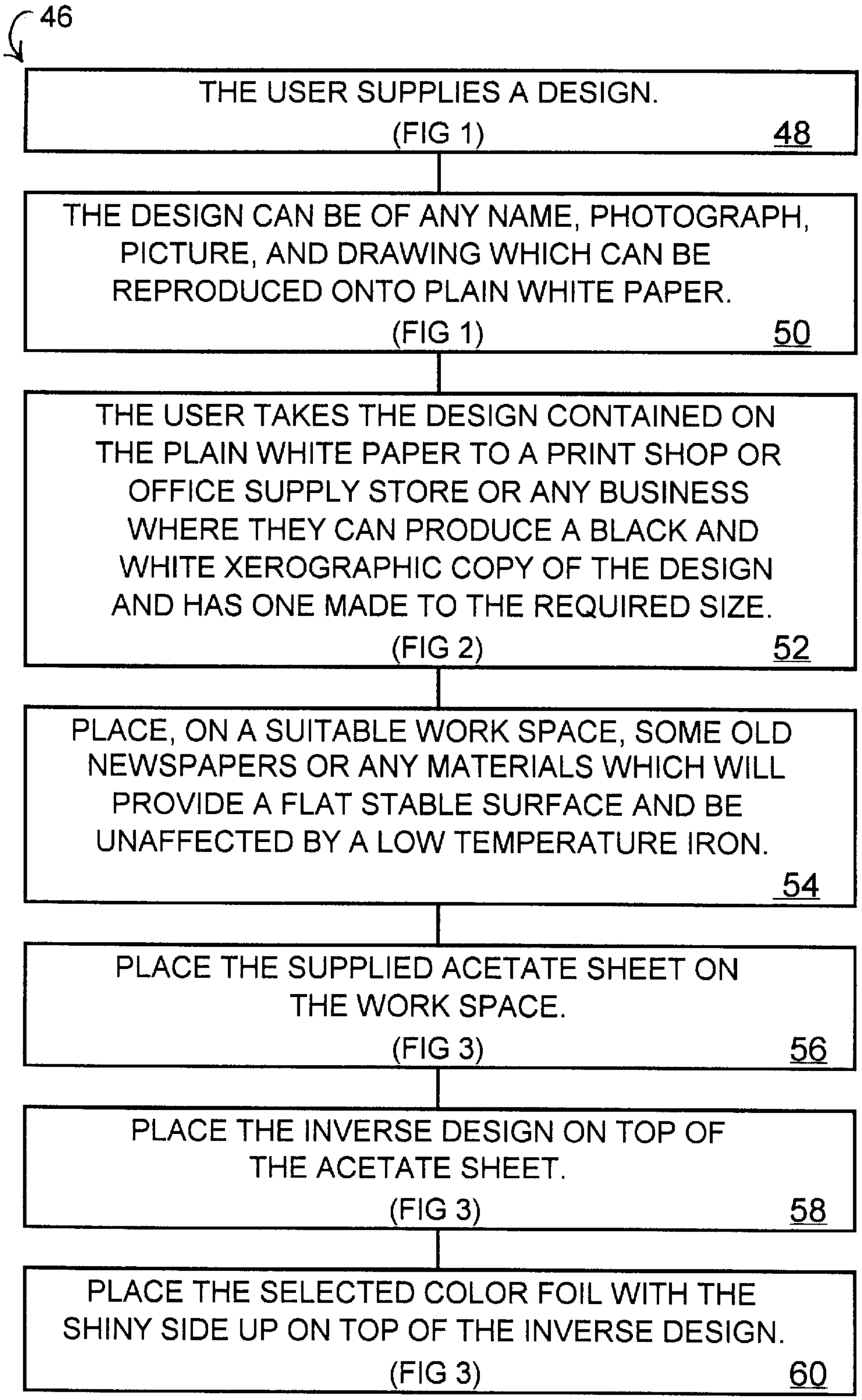
FIGS. 14, 15 and 16 are a block diagram flow chart for the first embodiment.
Figure 15:
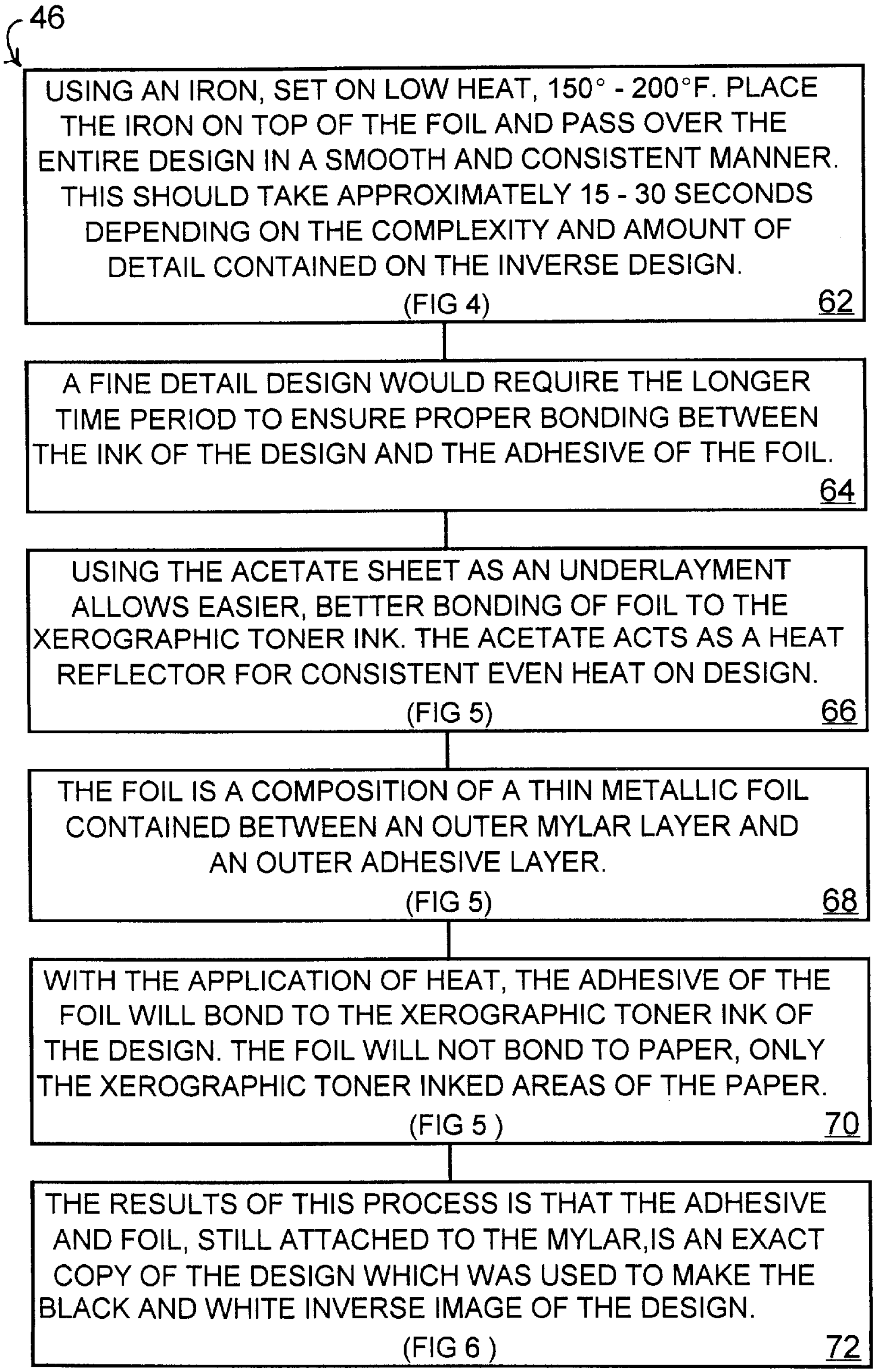
Figure 16:
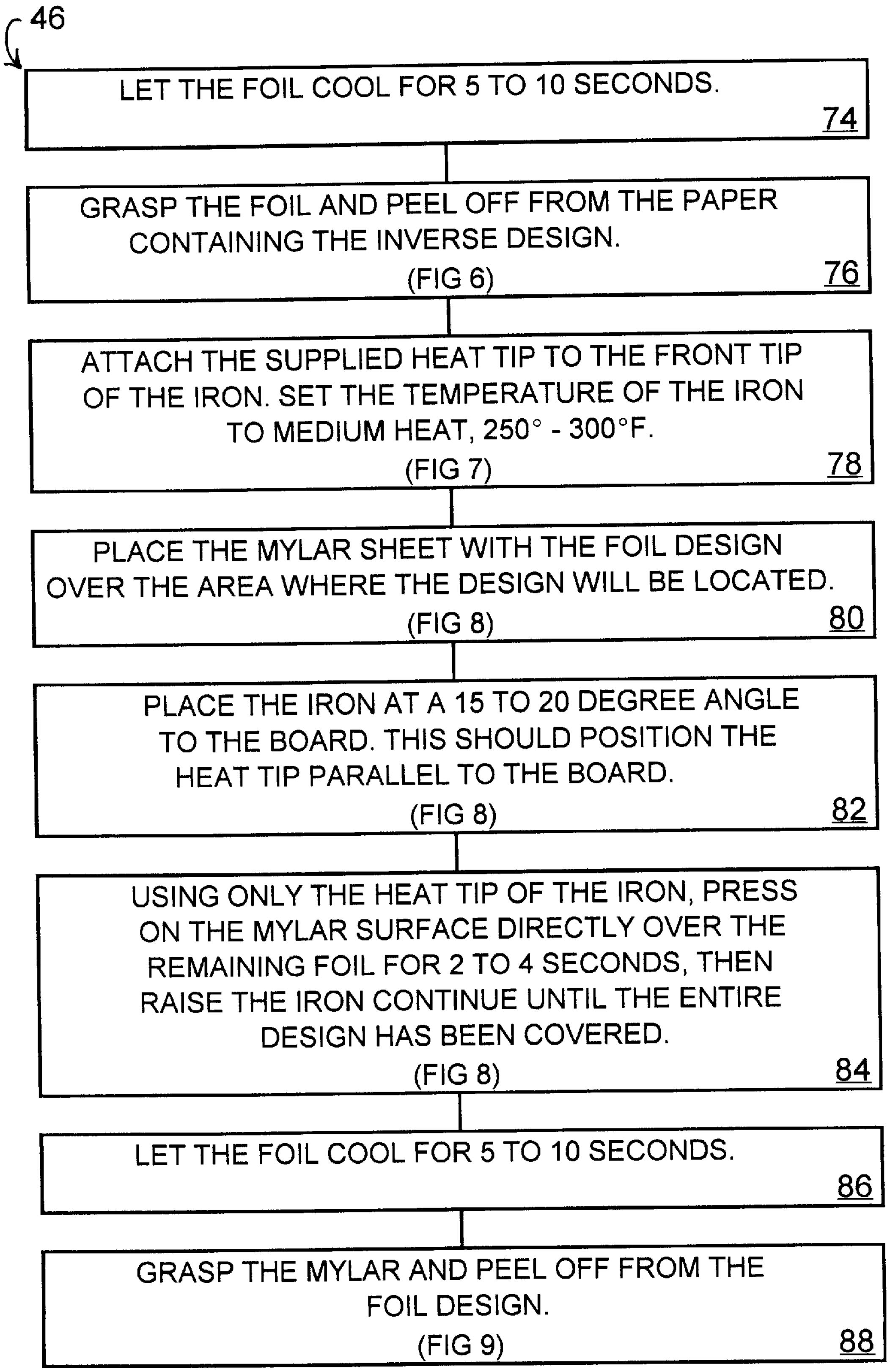

A first block diagram flow chart 46 is shown in FIGS. 14 to 16 for the first embodiment. First box 48 relates to step one and FIG. 1. Second box 50 relates to step one and FIG. 1. Third box 52 relates to step two and FIG. 2. Fourth box 54 relates to step three. Fifth box 56 relates to step four and FIG. 3. Sixth box 58 relates to step five and FIG. 3. Seventh box 60 relates to step six and FIG. 3.

Figure 4:
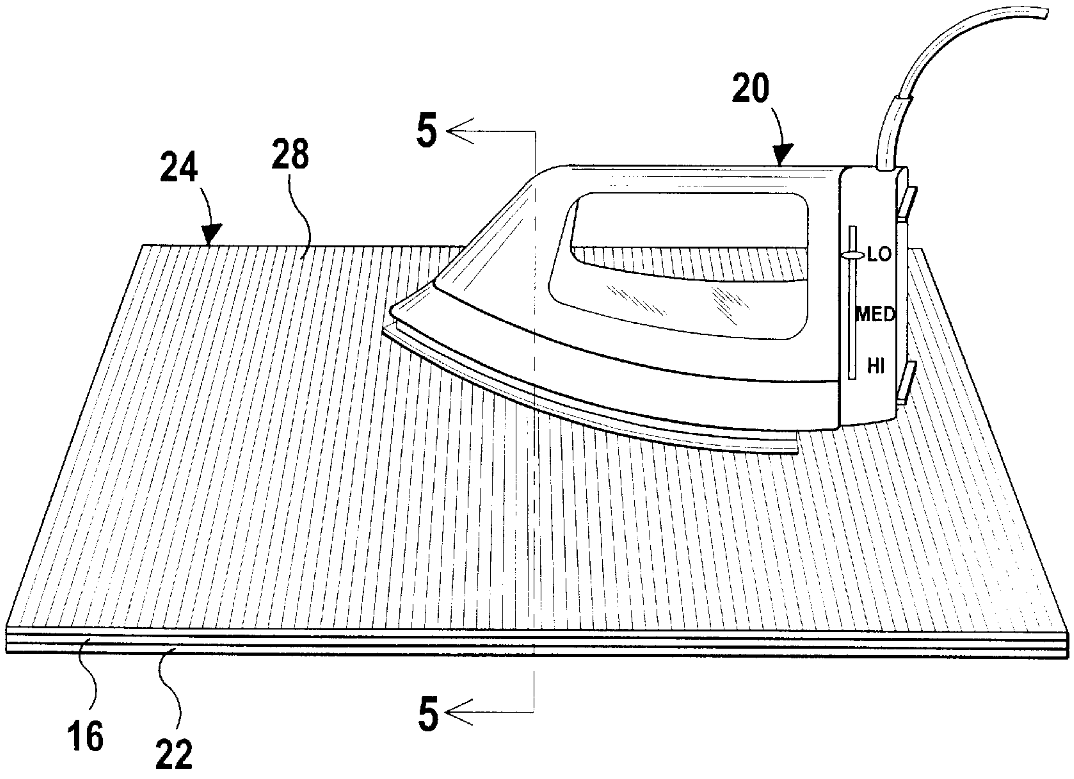
FIG. 4 is a perspective view, showing an iron applying heat to the three components in step seven of the first embodiment.

Eighth box 62 relates to step seven and FIG. 4. Ninth box 64 relates to step seven. Tenth box 66 relates to step eight and FIG. 5. Eleventh box 68 relates to step six and FIG. 5. Twelfth box 70 relates to step eight and FIG. 5. Thirteenth box 72 relates to step ten and FIG. 6.

Fourteenth box 74 relates to step nine. Fifteenth box 76 relates to step ten and FIG. 6. Sixteenth box 78 relates to step eleven and FIG. 7. Seventeenth box 80 relates to step twelve and FIG. 8. Eighteenth box 82 relates to step thirteen and FIG. 8. Nineteenth box 84 relates to step fourteen and FIG. 8. Twentieth box 86 relates to step fifteen. Twenty first box 88 relates to step sixteen and FIG. 9.

Figure 17:
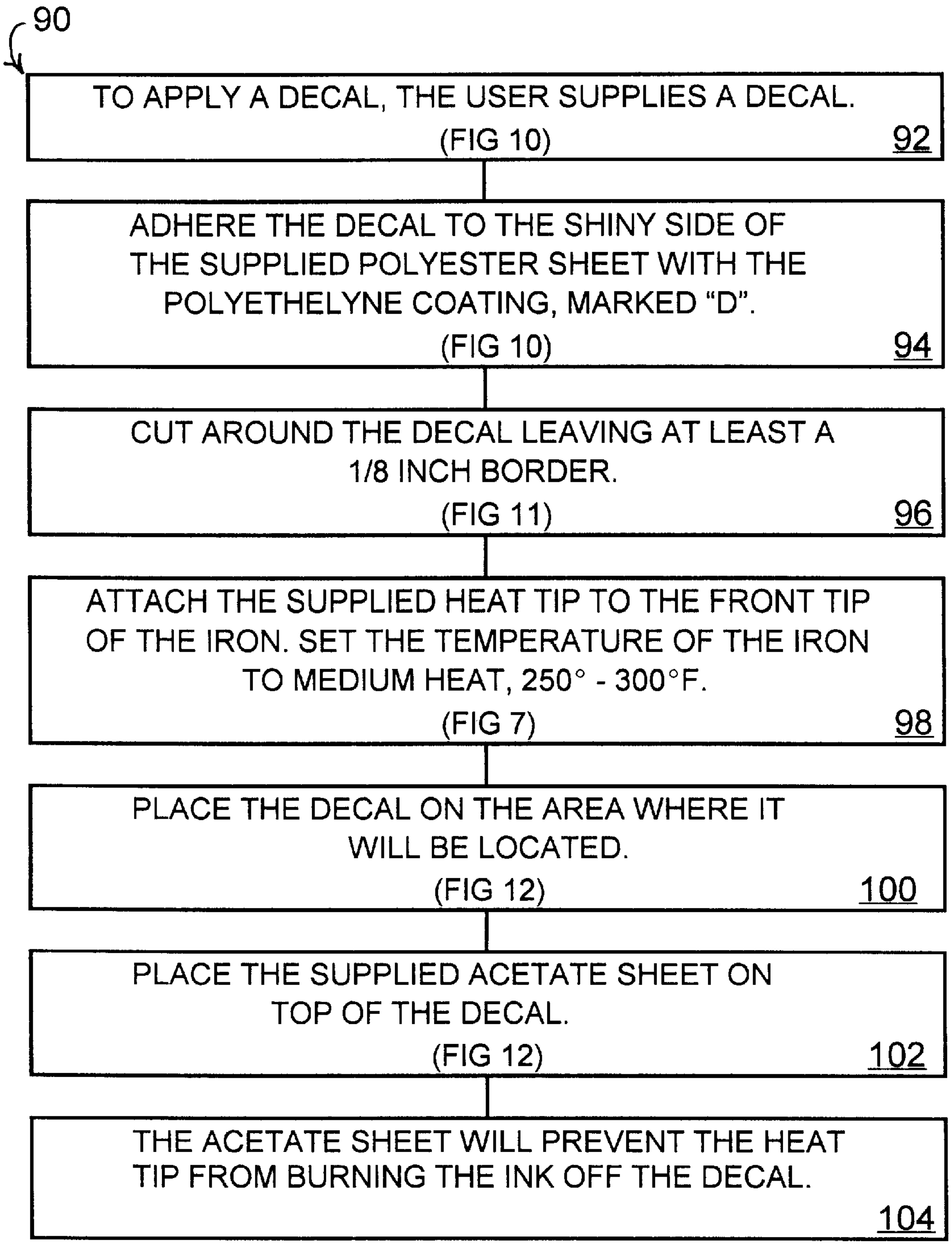
FIGS. 17 and 18 are a block diagram flow chart for the second embodiment.
Figure 18:
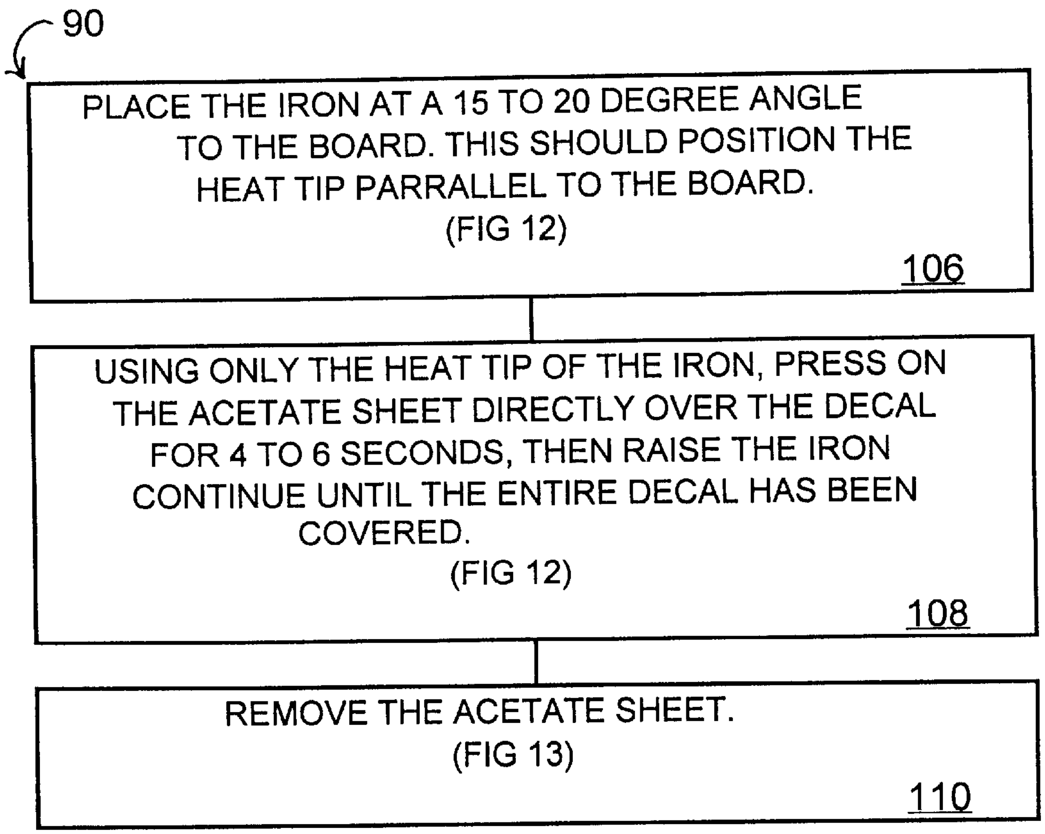

A second block diagram flow chart 90 is shown in FIGS. 17 and 18 for the second embodiment. First box 92 relates to step one and FIG. 10. Second box 94 relates to step two and FIG. 10. Third box 96 relates to step three and FIG. 11. Fourth box 98 relates to step four and FIG. 7. Fifth box 100 relates to step five and FIG. 12. Sixth box 102 relates to step six and FIG. 12. Seventh box 104 relates to step six. Eighth box 106 relates to step seven and FIG. 12. Ninth box 108 relates to step eight and FIG. 12. Tenth box 110 relates to step nine and FIG. 13.

LIST OF REFERENCE NUMBERS

10 support member
11 flat bodyboard for 10
12 design on 14
14 piece of plain white paper
16 black and white xerographic copy
18 inverse design on 16
20 iron
22 acetate sheet
24 hot stamping foil sheet
26 thin metallic foil layer of 24
28 Mylar layer of 24
30 adhesive layer of 24
32 xerographic toner ink on 16
34 heat tip
36 front tip of 20
38 decal
40 acetate sheet
42 eighth of an inch border on 40
44 ink on 38
46 first block diagram flow chart
48 first box of 46
50 second box of 46
52 third box of 46
54 fourth box of 46
56 fifth box of 46
58 sixth box of 46
60 seventh box of 46
62 eighth box of 46
64 ninth box of 46
66 tenth box of 46
68 eleventh box of 46
70 twelfth box of 46
72 thirteenth box of 46
74 fourteenth box of 46
76 fifteenth box of 46
78 sixteenth box of 46
80 seventeenth box of 46
82 eighteenth box of 46
84 nineteenth box of 46
86 twentieth box of 46
88 twenty first box of 46
90 second block diagram flow chart
92 first box of 90
94 second box of 90
96 third box of 90
98 fourth box of 90
100 fifth box of 90
102 sixth box of 90
104 seventh box of 90
106 eighth box of 90
108 ninth box of 90
110 tenth box of 90

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A method for employing graphics on a support member which comprises:

a) supplying a decal by a user;
b) adhering the decal to the shiny side of a supplied polyester sheet marked "D", with a polyethylene coating on one surface of the polyester sheet; and
c) cutting the polyester sheet around the decal leaving at least an eighth of an inch border.

2. A method as recited in claim 1, further comprising:

a) attaching a supplied heat tip to the front tip of an iron operating at a temperature of one hundred and fifty degrees to two hundred degrees Fahrenheit;
b) placing the polyester sheet to which the decal is adhered on an area of the support member where it will be located;
c) placing a supplied acetate sheet on top of the decal, so that the acetate sheet will prevent the heat tip from burning the ink off the decal;
d) placing the iron at a fifteen to twenty degree angle to the support member, so as to position the heat tip parallel to the support member;
e) pressing the heat tip on the iron on the acetate sheet directly over the decal for four to six seconds, then raise the iron and continue until the entire decal has been covered; and
f) removing the acetate sheet.

3. A method for employing graphics on a support member which comprises:

a) supplying a decal by a user;
b) adhering the decal to the shiny side of a supplied polyester sheet marked "D", with a polyethylene coating on one surface of the polyester sheet; and
c) cutting the polyester sheet around the decal leaving at least an eighth of an inch border;
d) attaching a supplied heat tip to the front tip of an iron operating at a temperature of one hundred and fifty degrees to two hundred degrees Fahrenheit;
e) placing the polyester sheet to which the decal is adhered on an area of the support member where it will be located;
f) placing a supplied acetate sheet on top of the decal, so that the acetate sheet will prevent the heat tip from burning the ink off the decal;
g) placing the iron at a fifteen to twenty degree angle to the support member, so as to position the heat tip parallel to the support member;
h) pressing the heat tip on the iron on the acetate sheet directly over the decal for four to six seconds, then raise the iron and continue until the entire decal has been covered; and
i) removing the acetate sheet.

* * * * *